(12) United States Patent
Conrad

(10) Patent No.: US 6,475,352 B2
(45) Date of Patent: Nov. 5, 2002

(54) METHOD AND APPARATUS FOR MONITORING AN OZONE GENERATOR IN A HOUSEHOLD WATER PURIFIER

(75) Inventor: Wayne Conrad, Hampton (CA)

(73) Assignee: Fantom Technologies Inc., Welland (CA)

(*) Notice: Subject to any disclaimer, the term of this patent is extended or adjusted under 35 U.S.C. 154(b) by 0 days.

(21) Appl. No.: 09/758,255

(22) Filed: Jan. 12, 2001

(65) Prior Publication Data

US 2002/0060190 A1 May 23, 2002

Related U.S. Application Data

(60) Provisional application No. 60/252,425, filed on Nov. 22, 2000.

(51) Int. Cl.[7] .............................................. B01J 19/08
(52) U.S. Cl. ........................................ 204/176; 210/760
(58) Field of Search ............................ 204/176; 210/760

(56) References Cited

U.S. PATENT DOCUMENTS

| | | | |
|---|---|---|---|
| 3,692,180 A | 9/1972 | LaRaus | 210/139 |
| 4,128,768 A | 12/1978 | Yamamoto et al. | |
| 4,298,467 A | 11/1981 | Gartner et al. | 210/96.1 |
| 4,412,924 A | 11/1983 | Feather | 210/744 |
| 4,599,166 A | 7/1986 | Gesslauer | 210/96.1 |
| 4,959,142 A | 9/1990 | Dempo | 210/167 |
| 5,075,016 A | 12/1991 | Barnes | 210/760 |
| 5,207,993 A | 5/1993 | Burris | 422/256 |
| 5,451,314 A | 9/1995 | Neuenschwander | |
| 5,540,898 A * | 7/1996 | Davidson | 422/186.15 |
| 5,582,717 A | 12/1996 | Di Santo | 210/86 |
| 5,670,094 A | 9/1997 | Sasaki et al. | 261/27 |
| 5,683,576 A | 11/1997 | Olsen | 210/138 |
| 5,709,799 A | 1/1998 | Engelhard | 210/748 |
| 5,711,887 A | 1/1998 | Gastman et al. | 210/748 |
| 5,741,416 A | 4/1998 | Tempest, Jr. | 210/90 |
| 5,765,403 A | 6/1998 | Lincoln et al. | 68/13 R |
| 5,766,488 A | 6/1998 | Uban et al. | 210/739 |
| 5,785,866 A | 7/1998 | Gehringer et al. | 210/748 |
| 5,900,143 A | 5/1999 | Dalton et al. | 210/192 |
| 6,312,588 B1 | 11/2001 | Conrad et al. | |

FOREIGN PATENT DOCUMENTS

| | | | |
|---|---|---|---|
| EP | 0 339 924 | 11/1998 | |
| GB | 2257429 A | 11/1991 | |
| JP | 1299694 | 12/1989 | 210/241 |
| WO | WO 97 49636 | 12/1997 | |
| WO | WO 97/49636 | * 12/1997 | |
| WO | WO 00 27761 | 5/2000 | |

* cited by examiner

Primary Examiner—Kishor Mayekar
(74) Attorney, Agent, or Firm—Philip C. Mendes da Costa Bereskin & Parr

(57) ABSTRACT

A water treatment apparatus is operated by providing water to be treated in a reactor; passing air through a gas flow path which includes an ozone generator wherein the passage of the air through the ozone generator produces ozone enriched air, and subsequently introducing the ozone enriched air into the reactor from the gas flow passage; providing an electric current source for powering the ozone generator; providing an member to emit a signal (preferably a visible signal) representative of the level of current drawn by the ozone generator; and, using a sensor to monitor the signal produced by the member.

17 Claims, 5 Drawing Sheets

METHOD AND APPARATUS FOR MONITORING AN OZONE GENERATOR IN A HOUSEHOLD WATER PURIFIER

This application claims priority from U.S. provisional application Serial No. 60/252,425 filed on Nov. 22, 2000.

FIELD OF THE INVENTION

This invention relates of an apparatus for the production of water fit for human consumption from water contaminated by micro-organisms, chemicals, heavy metals and minerals.

BACKGROUND OF THE INVENTION

The production of water fit for human consumption from water contaminated by micro-organisms, chemicals, heavy metals and minerals is a requirement throughout the world. Many different proposals have been made for the purification of contaminated water.

The most popular system in widespread domestic (household) use for the purification of contaminated water is a pitcher wherein contaminated water is passed through a filter made of a combination of a porous media filter, activated carbon, and an ion exchange resin and into a clean water reservoir within the pitcher. This type of system will reduce the levels of chlorine, lead, and pesticides. However, there are several disadvantages associated with this device. The first disadvantage of this water purification system is that the structure of the filter provides a breeding ground for micro-organisms thereby multiplying the dangers of micro-organisms which may be present in very low numbers. Another disadvantage of such a water purification system is that the filter life is not measured and it is possible for the user to employ the filter beyond its useful life. A further disadvantage of such a water purification system is that oils and fuels often present in water drawn from lakes and rivers are not readily removed and that these oils and fuels tend to coat the filters and damage their operational life and effectiveness. Other filters incorporate an iodine product to minimize the risk of microbiological hazards, however, these materials often impart undesirable tastes and many are potential carcinogens.

Another popular system in use for the purification of contaminated water is a system which employs an ultraviolet light for disinfection in series with a porous media and carbon filter. This type of system will reduce the levels of chlorine, lead, and pesticides and has some disinfection capability. However, there are several disadvantages associated with this device. A disadvantage of this water purification system is that the ultraviolet light's disinfection efficacy is greatly diminished by turbidity or color in the water which can cause the filter to become contaminated by micro-organisms which can readily live and breed therein thereby multiplying the danger from any micro-organisms which may be present.

SUMMARY OF THE INVENTION

The present invention provides several novel features for a water treatment apparatus and components which may be used therein including a novel control system for a water treatment apparatus, a novel construction for an ozone generator, a novel filter assembly for a water treatment apparatus, a novel method for monitoring the concentration of ozone produced by a corona discharge ozone generator, a novel method for monitoring the life of a filter based on the flow rate of gas through a venturi and a novel structure for an ozone generator to prevent water backing up into the ozone generator.

In accordance with the instant invention, there is provided a method for operating a water treatment apparatus comprising providing water to be treated in a reactor; passing air through a gas flow path which includes an ozone generator wherein the passage of the air through the ozone generator produces ozone enriched air, and subsequently introducing the ozone enriched air into the reactor from the gas flow passage; providing an electric current source for powering the ozone generator; providing an member to emit a signal representative of the level of current drawn by the ozone generator; and, using a sensor to monitor the signal produced by the member.

In one embodiment the member broadcasts the signal.

In another embodiment, the member emits an electromagnetic signal.

In another embodiment, the member is an electrically powered light emitting member which is powered by the electric current source to provide a level of illumination indicative of the level of current drawn by the ozone generator.

In another embodiment, the method further comprises monitoring the rate of flow of air through the gas flow passage and monitoring the amount of ozone produced by the ozone generator by monitoring the signal provided by the member and terminating the operation of the water treatment apparatus if one or both the rate of flow of air and the amount of ozone produced by the ozone generator vary from preset values.

In accordance with the instant invention, a method of monitoring the production of ozone from an ozone generator comprises providing an electric current source for powering the ozone generator; providing an electrically powered light emitting member which is powered by the electric current source to provide a level of illumination indicative of the level of current drawn by the ozone generator; and, using a sensor to monitor the amount of illumination produced by the light emitting member.

In accordance with the instant invention, an apparatus for monitoring the production of ozone from an ozone generator comprising a circuit including an electric current source, an electrically powered radiation emitting member and a radiation sensor positioned proximate the radiation emitting member.

In one embodiment, the radiation emitting member is a light emitting member and the radiation sensor is a light sensor.

In another embodiment, the radiation emitting member is capacitively coupled to the ozone generator.

In another embodiment, the light emitting member comprises a neon light bulb.

DESCRIPTION OF THE DRAWINGS

These and other advantages will be more fully and completely understood in conjunction with the following description of the preferred embodiments of the instant invention in which.

DESCRIPTION OF THE PREFERRED EMBODIMENT

As referred to herein, a domestic liquid treatment apparatus can be used in a house, cottage, mobile home or the like. The sources of liquid that may be treated include, but are not limited to: a municipal water supply which is fed to a house through supply pipes; a well maintained by a home owner; or any other source of water to which a home owner may have access. The liquid treatment apparatus is also well adapted to be used outside of a residence, such as on a camping trip provided a suitable source of power, e.g. battery, a small generator or solar power, is available.

Figure 1:
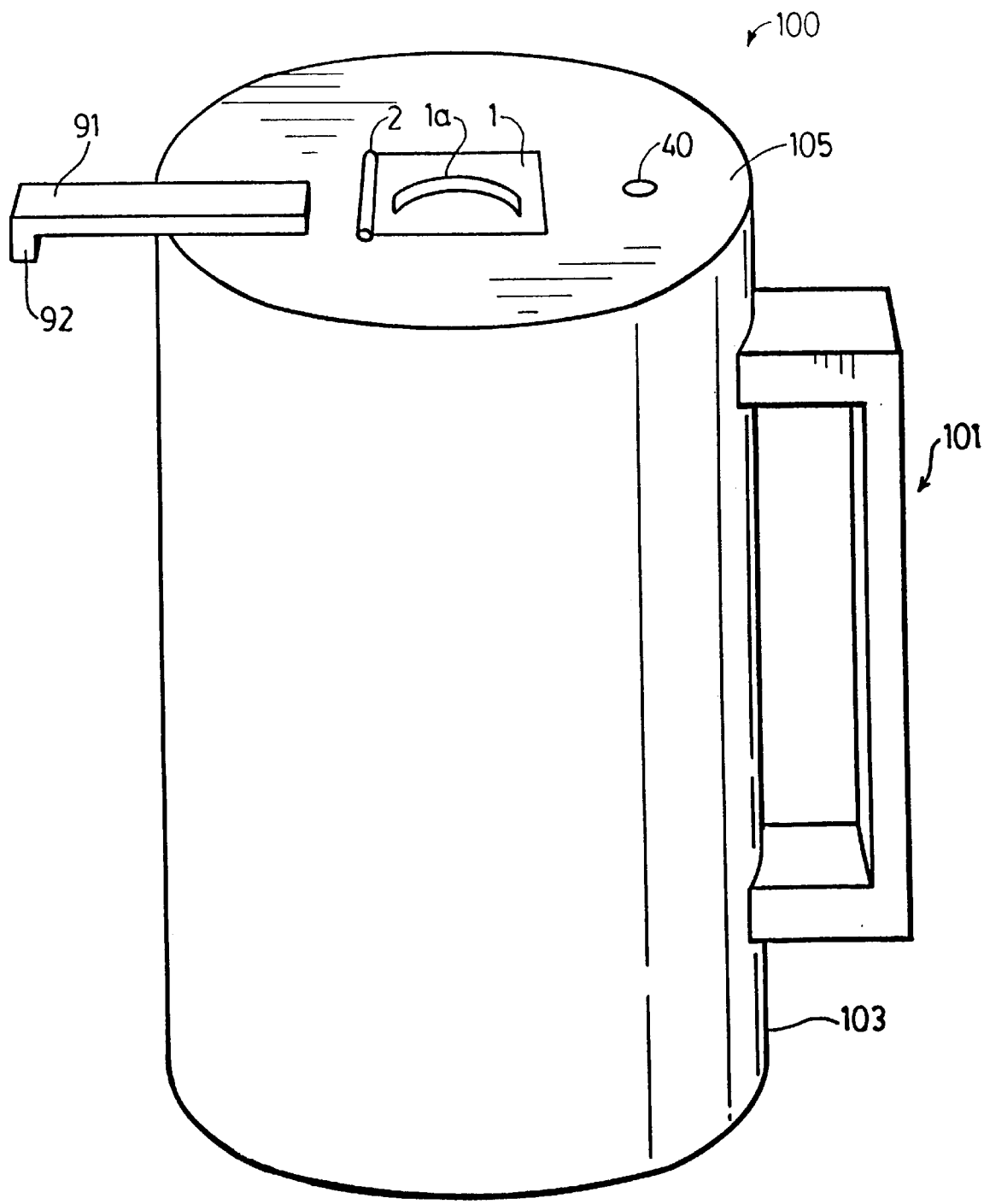
FIG. 1 is a perspective view of a treatment apparatus according to one aspect of this invention.

Referring to FIG. 1, a water treatment apparatus 100 for treating liquid comprising water with a gas comprising ozone is exemplified. Preferably, the liquid consists of water and the gas comprises air containing ozone. Accordingly, the apparatus 100 may be used for purifying and disinfecting water by means of ozone. Water treatment apparatus 100 may be of any configuration and size which will house a water treatment reactor 9 comprising a reservoir for receiving the desired volume to be treated. Water treatment reactor 9 may be sized to treat from about 0.5 to about 5, preferably from about 1 to about 3 and more preferably from about 1 to about 2 liters of water per batch. Water treatment apparatus 100 may include a handle 101 which is affixed to outer housing 103 for lifting and carrying the unit. Optionally, some of the working components of the system, such as the electronics, may be house in handle 101.

Water treatment apparatus 100 comprises a water treatment reactor 9, a water inlet 7, an ozone source (e.g. ozone generator 20) and a filter 10. A schematic of how the working components may be placed within outer housing 103 is shown in FIG. 2; however, it will be appreciated that differing configurations of the working components is possible using the operating principles exemplified by the embodiment of FIG. 2.

Figure 2:
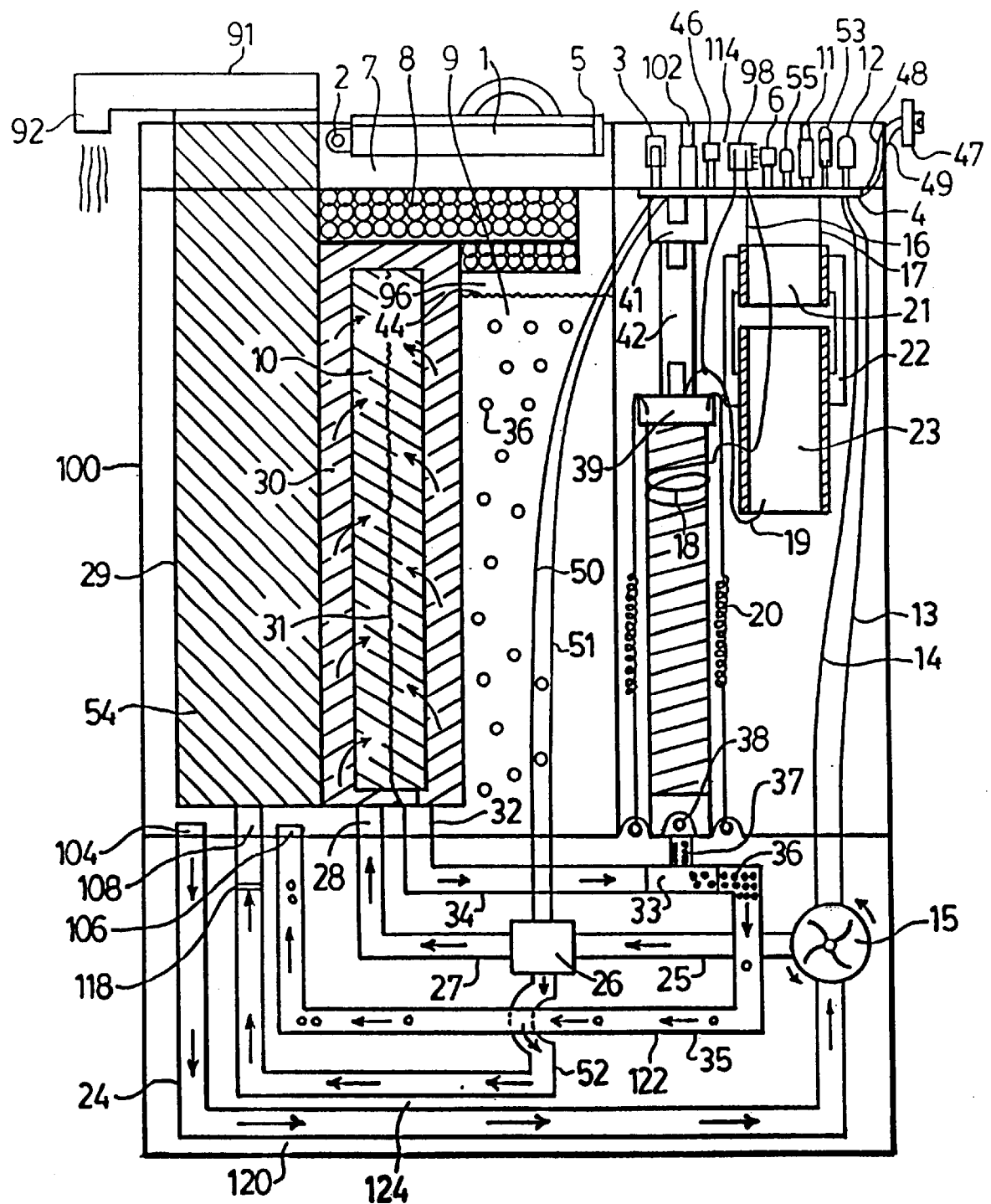
FIG. 2 is a schematic drawing of a treatment apparatus according to one aspect of this invention.

In the embodiment of water treatment apparatus 100 which is illustrated in FIG. 2, water inlet 7 is provided with a cover, which is used to prevent undesirable material, e.g. leaves, twigs etc. from entering the apparatus in the event the unit is used outdoors. The cover may be a resealable cap which may be removably affixed to the system by any suitable method, such as a thread or a bayonet mount. In such an embodiment, when the cap is closed the system is sealed. In a preferred embodiment of the invention, lid 1 does not seal water inlet 7 and is rotatably mounted to top 105 of apparatus 100 such as by a pivot or a hinge 2 is provided. Lid 1 may be provided with lid handle 1a for use in opening and closing lid 1.

A sensor may optionally be employed to assess whether the lid 1 is in the closed position. The sensor may be an optical sensor or a mechanical sensor (e.g. a switch is moved to close an electric circuit when lid 1 is closed) or an electrical sensor (e.g. lid 1 may itself close an electric circuit when lid 1 is closed). Preferably, the sensor is magnetic. For example, the sensor may comprise a magnet 5 and a corresponding magnetic reed switch 3. Magnet 5 is located in the end of the lid 1 such that when lid 1 is in the closed position, magnet 5 is proximate to a magnetic reed switch 3 which is located on, e.g., circuit board 4.

Figure 4:
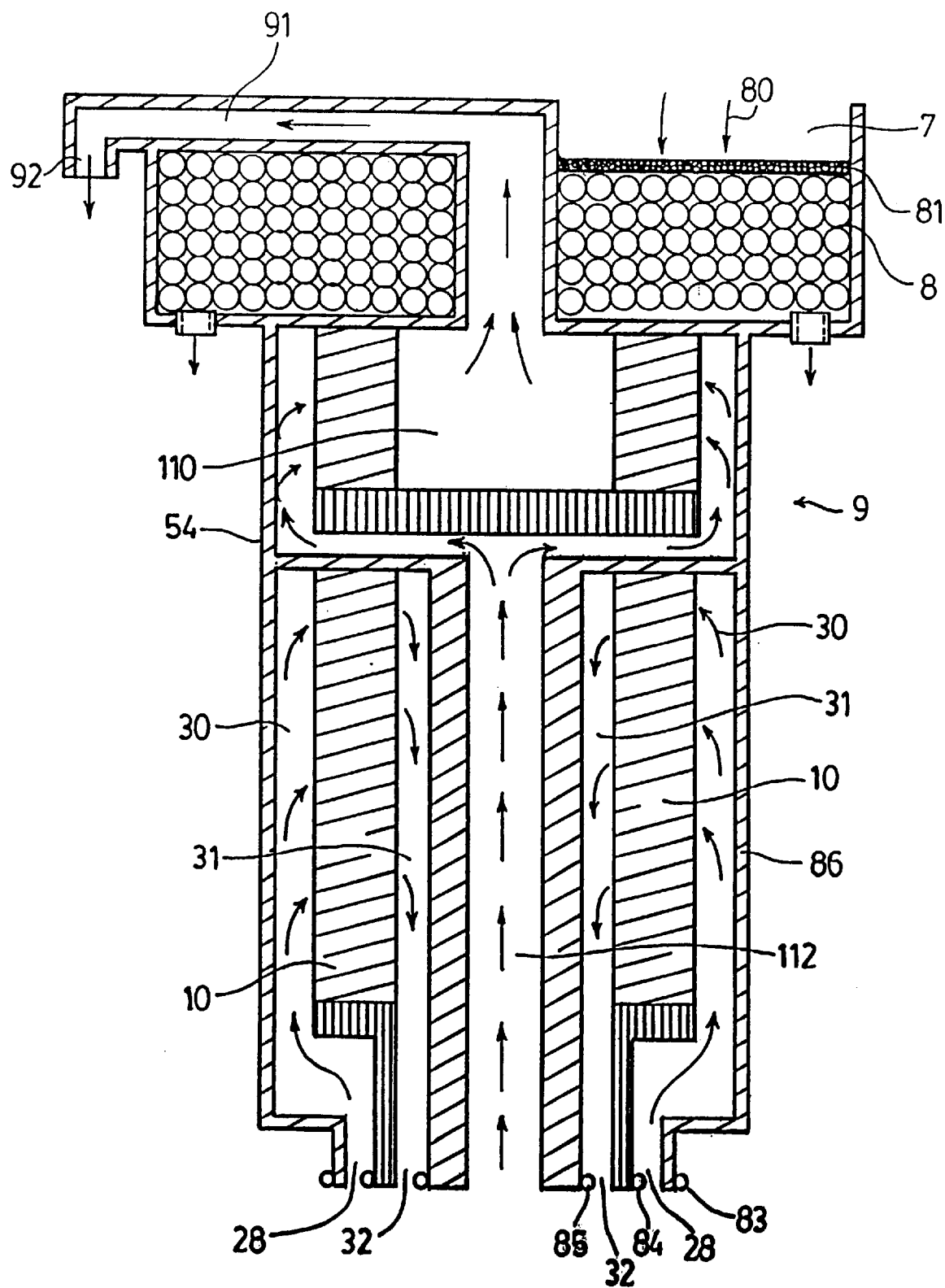
FIG. 4 is a cross-section through a water filter assembly according to another aspect of this invention which includes a polishing filter; and, FIG. 5 is a perspective view of the water filter assembly of FIG. 4.
Figure 5:
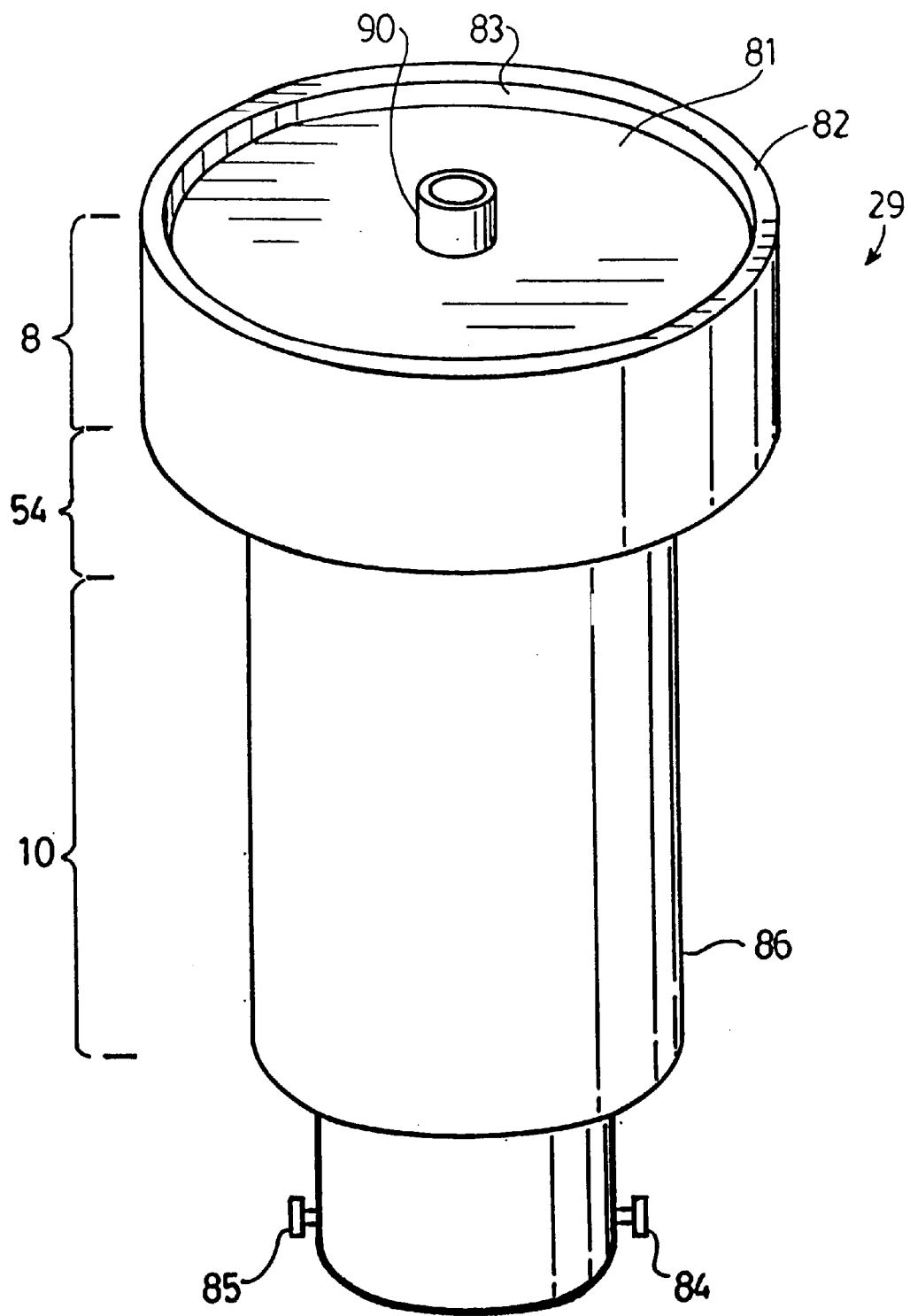

In accordance with one aspect of the instant invention, a filter assembly having at least two filter elements shown generally at 29 is provided (see FIGS. 4 and 5). Preferably, filter assembly 29 is provided within reactor 9 although, in some embodiments, it will be appreciated that filter assembly may be positioned exterior to reactor 9 and connected in flow communication with reactor 9 by suitable piping as is known in the art. As shown in the embodiment of FIG. 5, filter assembly 29 has optional top perimeter 82 and inner side walls 83 to define a recess which functions as water inlet 7 and hold a quantity of water to be filtered through pre-filter 8. The filter assembly 29 may be comprised of two or more of the following filter elements: a pre-filter 8; a main filter 10; and, a polishing filter 54. The filter assembly 29 may comprise a main filter 10 and a polishing filter 54. Preferably, the filter assembly 29 comprises a pre-filter 8 and a main filter 10, and more preferably the filter assembly 29 comprises a pre-filter 8, a main filter 10 and a polishing filter 54. Preferably, filter assembly 29 with all of its filter elements, is adapted to be removable as a unit from the apparatus 100. Filter assembly 29 may be removably mounted in apparatus 100 by any means known in the filter art such as a screw thread or a bayonet mount. For example, as shown in FIG. 5 bayonet members 84 are provided on the lower end 85 of outer housing 86 and are releasably engagable with female bayonet members provided in apparatus 29 (not shown).

The timing of the replacement of filter assembly 29 may be left to the user, such as once every three months. Preferably, apparatus 100 includes a mechanism to advise the consumer when to change the filter (e.g. based upon water flow through the apparatus or on the time the apparatus has been operated or on the number of treatment cycles performed by the apparatus). One advantage of this design is that the consumer must replace all filter elements at the same time thereby ensuring that apparatus 100 is properly filtering the water at all times. Another advantage is the replacement of multiple filter elements is simplified. It will be appreciated that in an alternate embodiment, apparatus 100 may include all three filter elements, but that filter assembly 29 may contain only two of the filter elements or so that only two filter elements (e.g. pre-filter 8 and main filter 10) are removable as a unit. It will also be appreciated that filter assembly 29 may be configured to contain all three filter elements but that only two are removable as a unit with the third filter element being separately removable for replacement as may be required. For example, in the configuration shown in the embodiment of FIG. 2, polishing filter 54 could be provided as a separate removable filter element. Filter assembly 29 is preferably provided with treated water passageway mount 90 for removably receiving treated water passageway 91. It will be appreciated that treated water passageway 91 may be provided as a part of filter assembly 29.

In the embodiment of FIGS. 2, 4 and 5, pre-filter 8 is located just below the water inlet 7 so that water 80 entering apparatus 100 will flow directly through pre-filter 8. The pre-filter 8 may be comprised of any material that is well known in the art. Preferably, pre-filter 8 is comprised of granular activated carbon and may be covered by screen 81. The pre-filter 8 removes particulate matter and some chemicals from water 80 prior to water 80 entering the reactor 9. In this embodiment, pre-filter 8 is also positioned in the flow path of the off gas from reactor 9 to the atmosphere. Accordingly, the pre-filter 8 is used to destroy residual ozone. The ozone in the off gas also serves to disinfect the granular activated carbon. After passing through pre-filter 8, the off gas passes through water inlet 7, past lid 1 to the atmosphere. It will be appreciated that if lid 1 is sealed, then pressure will build up in reactor 9. In such a case, a separate vent path for the off gas may be provided or a pressure actuated valve may be associated with water inlet 7, or lid 1 if lid 1 seals water inlet 7, to allow the pressure in reactor 9 to build up to a predetermined level prior to off gas being vented from apparatus 100. Main filter 10 may be located adjacent to or below the pre-filter 8, and may be comprised of any material that is well known in the art. Preferably, main treatment filter 10 is comprised of a carbon block having inner space 31, which is surrounded by an annular space 30. Preferably, a polishing filter 54 is located adjacent the main filter 10 (beside main filter 10 in the embodiment of FIG. 2 and above main filter 10 in the embodiment of FIGS. 4 and 5). Polishing filter 54 is optionally provided to filter compounds present in the water after a treatment cycle.

In the embodiment of FIG. 2, system 100 is constructed to operate as a continuous flow batch process and, to this end, may have one or more fluid flow loops in fluid communication with reactor 9. Reactor 9 could comprise a flow reactor through which the water travels as it is ozonated. Alternately, or in addition, reactor 9 could comprise a tank from which the water is directed to flow through main filter 10 before being returned to the tank. The water may be ozonated in the tank or as the water is in transit. Preferably, reactor 9 is a multi-pass reactor. In a multi-pass reactor, the water is caused to pass at least twice, preferably, from 3 to 8 times and more preferably from 4 to 6 times through main filter 10 during a single treatment cycle. An embodiment of a multi-pass reactor is shown in FIG. 2 wherein there is provided a filtration loop 120 and an ozonation loop 122. A polishing filtration loop 124 is optionally provided. It will be appreciated that other of the developments of the embodiment of FIG. 2 may be used in other than a multi-pass reactor.

Filtration loop shown generally at 120 withdraws water from reactor 9 and returns it to main filter 10. More specifically, the filtration loop comprises the following elements in fluid communication: reactor 9, reactor outlet 104, first partially treated water passageway 24, water pump 15, second partially treated water passageway 25, valve 26 (which may be manually adjustable or electrically controlled such as a solenoid valve), main filter inlet passageway 27, and main filter inlet 28. Main filter inlet 28 is in fluid communication with annular space 30 which surrounds main filter element 10. Inner space 31 is provided interior of main filter element 10 (see FIG. 4) and is in fluid communication with main filter outlet 32.

Figure 3:
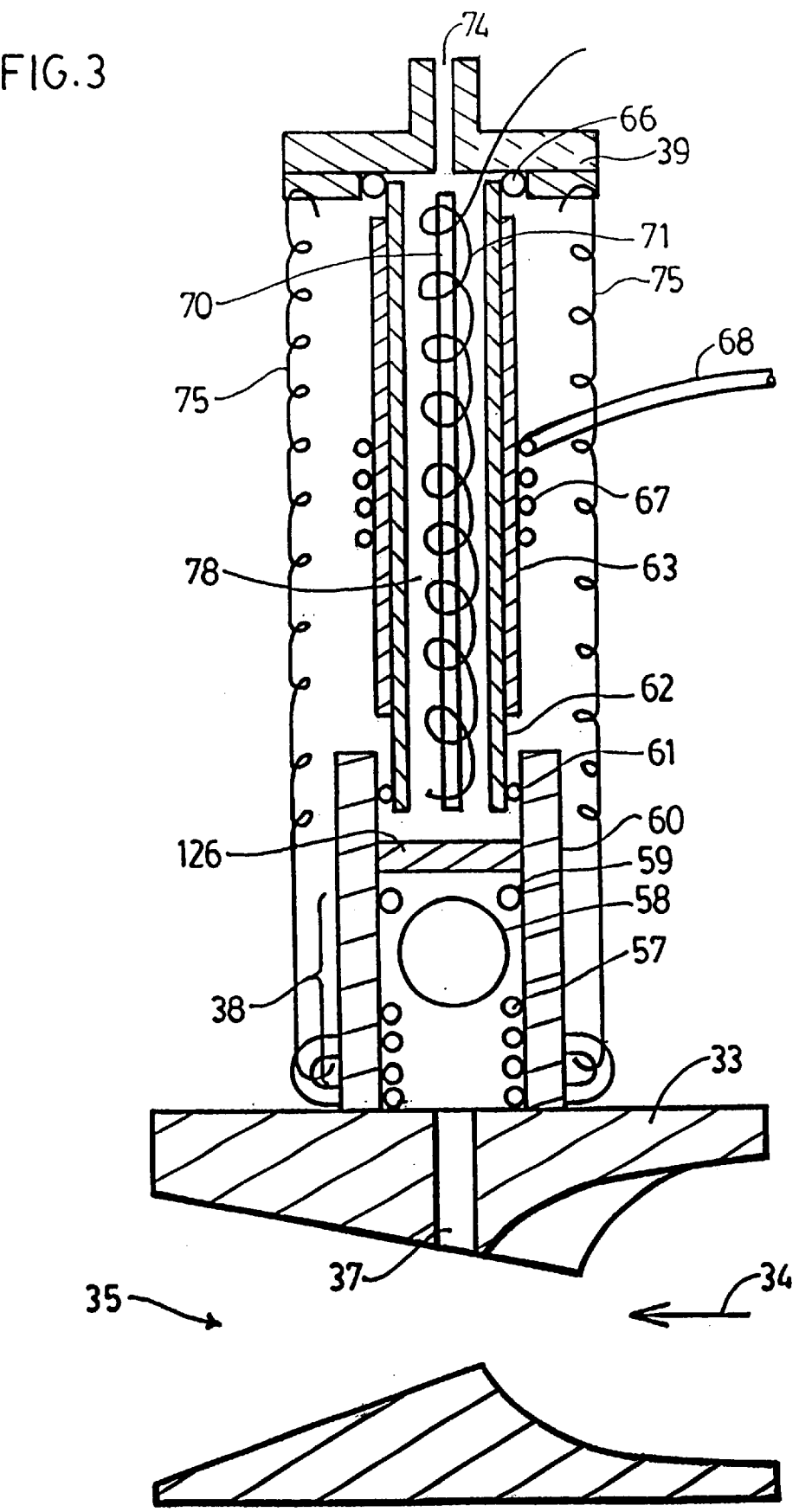
FIG. 3 is a cross-section through an ozone generator according to another aspect of this invention.

Ozonation loop shown generally at 122 withdraws water from main filter 10, injects the water with air containing ozone, and returns it to reactor 9. Alternately, if the filtered water enters reactor 9 after passing through main filter 10, e.g. it is positioned in reactor 9 or upstream of reactor 9, then ozonation loop 122 may draw water directly from reactor 9. More specifically, the ozonation loop 122 comprises the following elements in fluid communication: inner space 31 of main filter 10, main filter outlet 32, filtered water passageway 34, venturi 33, ozonated water passageway 35, reactor inlet 106 and reactor 9. An ozone generator 20 is in fluid communication with venturi 33 so that as water flows through ozonation loop 122, ozone produced in ozone generator 20 will be drawn into the water to be treated through venturi 33. Preferably a check valve is provided to prevent the back flow of water into ozone generator 20. In the embodiment of FIGS. 2 and 3, spring loaded check valve 38 is provided at the exit from ozone generator 20 and is comprised of the following elements: spring 57, ball seal 58, o-ring seal 59 and check valve support 60. As water flows through passages 34 and 35, a negative pressure is created in passageway 37 causing ball seal 58 to be drawn away from o-ring 59 thus opening the fluid connection with ozone generator 20 and permitting ozone enriched air to be drawn into passageway 37 and into the water passing through venturi 33. Ozone generator 20 may be any type as is well known in the art and may be powered by any means known in the art.

Polishing filtration loop shown generally at 124 withdraws water from reactor 9, and directs it to a polishing filter 54 prior to the treated water being dispensed. More specifically, the polishing filtration loop 124 comprises the following elements in fluid communication: reactor 9, reactor outlet 104, first partially treated water passageway 24, water pump 15, second partially treated water passageway 25, valve 26, polishing filter inlet passageway 52, polishing filter inlet 108, and polishing filter 54. The polishing filter 54 is fluidly connected to a treated water passageway 91, which is in fluid communication with a treated water outlet 92.

Apparatus 100 can receive power from any source of current including, but not limited to: an electrical outlet, a battery, a fuel cell, or any other power device well known in the art. Preferably, power is supplied by means of a wall plug 47, which is electrically connected to circuit board 4 via wires 48, 49. A transformer for stepping down the voltage may be provided as is known in the electrical art.

In accordance with another aspect of this invention, a simplified construction of an ozone generator is provided. Ozone generator 20 is preferably of the corona discharge type and has a discharge gap 73 and a dielectric element 62 that is provided between high voltage electrode 71 and ground electrode 63. Ozone generator 20 may be powered by any means known in the art. Preferably, a high frequency signal applied to wires 16, 17 passes into primary coil 21, which induces a magnetic flux through ferrite 22 and transmits the flux to high voltage secondary bobbin 23. This creates a high voltage which is transmitted through wires 18 and 19, which are attached to ozone generator 20. When a high voltage is applied between the spiraled wire 71 and the metal ground plane 63, a cold corona discharge is produced which converts at least a portion of the oxygen in the gas flowing through air gap 73 to ozone.

In accordance with the simplified construction of ozone generator 20, ozone generator does not have a longitudinally extending outer housing. Instead, ozone generator has opposed end caps fixedly held in place with respect to each other. The end caps have an air inlet and an air outlet and together with air gap 73, define the air flow passage through ozone generator 20. In the embodiment shown in FIG. 3, the inlet end cap is denoted by reference numeral 39 which has air inlet 74 and check valve support 60 is used as the outlet end cap such that passageway 37 form the air outlet. It will be appreciated that a separate outlet end cap may be provided so that ozone generator 20 may be separately assembled prior to insertion into a device such as apparatus 100. One advantage of this design is that the ozone generator will not retain as much heat during operation and, in fact, is easier to cool, such as by providing a cooling air flow over ground electrode 63. As the amount of ozone produced decreases at increased operating temperatures, the use of a construction which does not include an outer housing allows ozone generator 20 to operate at cooler temperatures and avoid a drop off in ozone production which occurs at higher operating temperatures. Preferably, the end caps are releasably secured together so that ozone generator may be easily disassembled for servicing as may be required. To this end, the end caps may be held into place by a plurality of securing members which are preferably resilient such as elastomeric members or springs 75 (e.g. 3 equidistantly spaced around electrode 63) which extend, e.g. between the end caps. In the case of the embodiment of FIG. 3, springs 75 extend between end cap 39 and check valve support 60. The connection between end cap 39 and dielectric element 62 is sealed to prevent the leakage of ozone, such as by o-ring 66. Similarly, the connection between the outlet end cap (check valve support 60) and dielectric element 62 is sealed to prevent the leakage of ozone, such as by o-ring 61. As the outlet end cap is part of check valve 38 in the preferred embodiment, the seal between the outlet end cap and dielectric element 62 also creates a seal between ozone generator 20 and check valve 38.

The dielectric element 62 may be comprised of any material as is well known in the art such as ceramic. In one embodiment of the invention, the dielectric 62 is preferably comprised of plastic. Ground electrode 63 may be a metal tube provided exterior to dielectric 62. Preferably, dielectric element 62 is coated with a metal to form ground plane 63. The metal ground plane 63 is electrically connected to ground such as by spring 67 which secures ground wire 68 to ground plane 63. High voltage electrode 71 may comprise a spiraled wire 71 which is wrapped around plastic support 70.

When water flows through venturi 33, negative pressure or suction is created in gas flow passageway 37, which causes spring loaded check valve 38 to open. That is, ball seal 58 moves downwards away from the o-ring 59, thus allowing gas to flow freely through gas flow passageway 37. Air is drawn in through air inlet 40 of top 105, through passageway 43, through air inlet 74 located in the ozone generator end cap 39, and ultimately through an air gap 73 located within the dielectric 62. When a high voltage is applied between the spiraled wire 71 and the metal ground plane 63, a cold corona discharge is produced which converts at least a portion of the oxygen in the gas flowing through air gap 73 to ozone.

Generally, a preferred method of operating the water treatment apparatus is as follows. Initially, water is provided to reactor 9 such as by pouring water into water inlet 7, and apparatus 100 is turned on. During the water treatment cycle, water continuously travels through the filtration loop 120 and the ozonation loop 122 (the multi-pass filtration cycle). When a treatment cycle is completed, apparatus 100 may be shut down by turning off both the water pump 15 and the ozone generator 20. Preferably, if any of the monitored parameters fall outside of the preset acceptable ranges, the micro-controller 6 will terminate the water treatment cycle, so that the failure may be further investigated and fixed. If a treatment cycle is completed and the monitored parameters are within the acceptable ranges, then the user may initiate a dispense cycle by depressing the dispense button 53 or apparatus 100 may include an auto dispense mode. During the dispense cycle, the water pump 15 is activated, and the treated water preferably flows through the polishing filtration loop 124 (i.e. through polishing filter 54) prior to exiting the apparatus via treated water passageway 91 and treated water outlet 92.

The following is a detailed discussion of a preferred mode of operation. Initially, a user opens optional lid 1 and pours the water into the water inlet 7. The water flows through pre-filter 8 into the reactor 9. The user then depresses start button 11 or the start of a water treatment cycle may be delayed until treated water is desired. When a treatment cycle is initiated, micro-controller 6 energizes water pump 15 via wires 13 and 14 to draw water from reactor 9 and to cause the water to flow sequentially through filtration loop 120 and then through ozonation loop 122. Preferably, ozone generator 20 is energized shortly after water pump 15 commences operation. In this way, the provision of current to ozone generator 20 may be delayed until the water flow produces an air flow through ozone generator 20. Water pump 15 withdraws water from reactor outlet 104, and causes the water to flow through first partially treated water passageway 24, water pump 15, second partially treated water passageway 25, solenoid valve 26, main filter inlet passageway 27, and into filter assembly 29 via main filter inlet 28. The water enters annular space 30 surrounding main filter 10. The water flows through main filter 10 into inner space 31, travels downwards through inner space 31, and exits the filter assembly 29 through filter outlet 32. From here, the water is withdrawn from the filter assembly 29, and flows through the ozonation loop 122. Specifically, the water is withdrawn from filter outlet 32, and flows through filtered water passageway 34 through venturi 33, where it receives an injection of air containing ozone gas. The water laden with ozone rich gas bubbles 36 then travels through an ozonated water passageway 35, and returns to reactor 9 via reactor inlet 106. Thus, in each pass through the system (flow loops 120 and 122), the water is filtered and ozonated. The treatment cycle preferably includes passing a volume of water equal to the volume of water to be treated in reactor 9 several times through the flow loops to achieve the multi-pass treatment. Ozone introduced into the water via venturi 33 is also used to treat water in reactor 9 since ozone rich bubbles 36 rise through the reactor 9, thus disinfecting the water in reactor 9. Upon reaching surface 44 of the water, the bubbles 36 collect in an off gas collection area 96. By using the filter assembly of the instant invention, the off gas passes from collection area 96 through pre-filter 8 to at least partially disinfect pre-filter 8 while converting the residual ozone in the off gas to oxygen.

The treatment cycle may be controlled by a timer. In such an embodiment, after a preset time, between a range, e.g., of about 2 to 20 minutes, preferably from 3 to 10 minutes, and more preferably between a range of 4 to 8 minutes, the micro-processor 6 may shut off both the water pump 15 and ozone generator 20. Optionally, ozone generator 20 may be de-energized while water pump continues to operate (e.g. for 30 seconds to 2 minutes) so as to draw air which does not contain ozone into reactor 9 to flush ozone from collection area 96. At the end of a treatment cycle, the water may be automatically dispensed or dispense switch 53 may be energized. Preferably, the user is signaled that the water is safe to dispense and use at the end of a successful treatment cycle. The user may be signaled when dispense switch 53 is energized. For example, an audible signal may be issued or a visual signal may be provided. In the embodiment of FIG. 2, dispense switch 53 contains a light. Once dispense switch 53 is energized, it may be manually actuated to initiate the dispensing of treated water when desired. By configuring the apparatus so that dispense switch 53 must be energized before if may be actuated to dispense water, water which has not been properly treated can not be accidentally dispensed.

When the user depresses dispense switch 53, micro-controller 6 actuates valve 26 (e.g. sends a signal by wires 50 and 51 to a solenoid valve) which diverts the flow of water from the main filter inlet passageway 28 to the polishing filter inlet passageway 52. When valve 26 is in the dispense position, water is withdrawn from reactor 9 and flows through polishing filtration loop 124. Specifically, water is withdrawn from reactor outlet 106, and flows through first partially treated water passageway 24, water pump 15, second partially treated water passageway 25, valve 26, polishing filter inlet passageway 52, and filter assembly 29 via polishing filter inlet 108. The water then travels from the polishing filter inlet 108, through the polishing filter 54, and ultimately exits apparatus 100 through treated water passageway 91 and treated water outlet 92. The dispense cycle is preferably terminated by monitoring the current drawn by water pump 15 and de-energizing pump 15 when the current drawn by water pump 15 changes to a lower current associated with cavitation of water pump 15.

Apparatus 100 may optionally include various safeguards and/or monitors to ensure that the system is running safely and optimally. One such safeguard is an automatic cycle counter to determine when one or more filters should be replaced. If apparatus 100 includes a filter assembly 29, then, together with a cycle counter, the user may be advised when to change all of the filters and may in fact change all of the filters in a single step. Thus the cycle counter may optionally be employed to keep track of the number of water treatment cycles, and signal the user to replace the filter assembly 29 after a preset number of cycles.

The cycle counter may be any type which is well known in the art. In one aspect of the invention the treatment cycles may be counted by the number of times that a cycle is initiated (e.g. by counting the number of times that start button 11 is pressed) or by the number of times that lid 1 is opened and/or closed. Preferably an automatic counter which counts the number of times that lid 1 is opened and/or closed is used. In one embodiment of the invention, the automatic counter consists of a light beam that is directed across one end of the water inlet 7. The lid 1 is determined to be in the closed position when the beam of light is broken by the presence of lid 1. More preferably, the automatic counter comprises a magnet 5 and a corresponding reed switch 3. When the user lifts lid 1 by rotating it around hinge 2, magnet 5 moves away from magnetic reed switch 3. When lid 1 is closed, magnet 5 is brought back into proximity of magnetic reed switch 3. Either or both of these movements may produce a signal that is used by micro-controller 6 to count an additional cycle. Preferably a cycle is counted when lid 1 is moved to the closed position ( magnet 5 is proximate to reed switch 3).

Micro-controller 6 preferably signal the user when one or more filter elements approaches and/or reaches the end of their useable life. The signal could be an audio or visual signal and is preferably filter monitor light switch 55, which flashes when a first preset number of cycles is reached to advise a user that the filter is approaching the end of its life. When a second preset number of cycles is reached, indicating the end of the life of the filter, micro-controller 6 preferably sends a different signal to the user (e.g. filter monitor light switch is lit but not flashing) advising the user that the filter has reached the end of its life and preventing the apparatus from operating another treatment cycle until the filter is replaced. The cycle counter could be automatically reset when filter assembly 29 is withdrawn from apparatus 100 or it may be manually reset such as by manually depressing filter monitor light switch 55.

If the signal is generated when lid 1 is closed, it may also be utilized to initiate a new water treatment cycle. In such an embodiment, if lid 1 is not in the closed position, then a signal may be issued (e.g. process light 12 may flash or change to a different color) to alert a user that an error has occurred and the water treatment cycle will not proceed until the lid is properly.

The operation of a treatment cycle may also be delayed until lid 1 is closed. For example, after the water is added to the system 100, the user may depresses start button 11. This action sends a signal to micro-controller 6 to initiate a new water treatment cycle. However, prior to starting the water treatment cycle, the magnetic reed switch 3 is used to determine whether the lid 1 is in the closed position. The lid 1 is determined to be in the closed position when the magnet 5 is proximate to the magnetic reed switch 3 to change the status of reed switch 3. Micro-controller 6 checks the status of reed switch 3 to ensure that lid 1 is. If lid 1 is closed, micro-controller 6 initiates the water treatment cycle by turning on the water pump 15 via wires 13 and 14, and the ozone generator 20 via wires 16 and 17. If lid 1 is not in the closed position, process light 12 will flash to indicate that an error has occurred. The water treatment cycle will not proceed until lid 1 is properly closed. Additionally, if lid 1 is not closed within a preset time, for example 30 seconds, the system 100 may shut down, and the start button 11 will need to be depressed again in order to initiate a new water treatment cycle.

Another such safeguard is to monitor the treatment of the water in reactor 9. This may be accomplished by use of an ORP sensor to monitor the degree of treatment of the water or an off gas ozone sensor to monitor the level of ozone in the off gas exiting collection area 96 or an ozone sensor 126 located downstream of the ozone generator 20. A range of acceptable ozone concentrations may be preset in controller 6 prior to the initiation of the water treatment cycle. If the concentration of the ozone as sensed by the ozone sensor 126 is too high or too low, a signal may be sent to the micro-controller 6 to terminate the water treatment cycle, and actuate a signal to notify the user of a system failure. The signal could include an audio or visual signal. Preferably, process failure light 102 is illuminated.

In accordance with another aspect of the instant invention, a simplified system is provided for ensuring that the water is treated to a desired level before it is dispensed. A given quality of water will need a predetermined dosage of ozone to purify the water. Thus, provided apparatus 100 is given a predetermined quality of water, and apparatus 100 is programmed to give that quality of water a predetermined dosage of ozone, then apparatus 100 will produce water of the desired purity. It will be appreciated that apparatus 100 may include a switch (e.g. tapping start button 11 to advise micro-controller 6 of the source of the water) to advise controller 6 of the quality of water which is fed to reactor 9 (e.g. municipal water, lake or well water, etc.) and controller 6 may be pre-programmed with different treatment times for each such setting. To ensure that apparatus 10 is providing the predetermined dosage of ozone to the water fed to reactor 9, the flow of air through apparatus 100 or the amount of ozone produced by ozone generator 20 are preferably monitored and compared with preset values that may be programmed into micro-controller 6. Preferably both of these factors are monitored. Monitoring the operation of ozone generator 20 ensures that ozone generator 20 is producing the expected amount of ozone. Measuring air flow ensures that the ozone generated by ozone generator 20 is reaching the water to be treated and enables controller 6 to indirectly monitor the concentration of ozone in the air being injected into the water by venturi 33. This ensures that the ozone generator 20 is continuously producing a concentration of ozone sufficient to completely treat the water. These factors are monitored and the water treatment cycle is terminated if any of the monitored parameters fall outside of the acceptable preset ranges. If the parameters are within the acceptable preset ranges, then the water treatment cycle preferably continues until a sensor detects that the water has been treated to a desired level or, more preferably, for a preset duration.

The air flow may be monitored by providing an air flow sensor. Preferably, the air flow sensor is positioned upstream of ozone generator 20. As shown in the embodiment of FIG. 2, air flow sensor 42 and airflow sensor cover 41 are provided upstream of ozone generator 20 and immediately downstream of air inlet 40. At a preset limit, controller 6 may send a fault signal to the user and/or terminate the treatment cycle. For example, if there is an obstruction in one of the passageways, or if venturi 33 becomes fouled, then controller 6 will detect a decrease in air flow (or an increase in back pressure) and may terminate the treatment cycle as insufficient ozone will be provided to the water in a preset time limit. If there is a sudden increase in air flow (or a sudden drop in pressure), this could indicate that one of the passageways has become disconnected and again the treatment cycle may be terminated as insufficient ozone will be provided to the water in a preset time limit.

The gas flow sensor employed may be any that is well know in the art. Preferably, the gas flow sensor is a thermister 42. As explained above, when water flows through venturi 33, negative pressure or suction is created in gas flow passageway 37, which causes spring loaded check valve 38 to open (e.g. ball 58 moves downwards away from o-ring seal 59, thus allowing gas to flow freely through gas flow passageway 37). Typically, air is drawn in through a thermister 42, past an airflow sensor cover 41, through an air inlet 74 located in the ozone generator end cap 39, and ultimately through an air gap 73 located within dielectric tube 62. Controller 6 is preprogrammed with an acceptable air flow range is preset prior to the initiation of the water treatment cycle. If the air flow as sensed by the thermister 42 is too high or too low, a signal may be sent to the micro-controller 6 to terminate the water treatment cycle and actuate a signal to notify the user of a system failure. One of the preset value programmed into controller 6 preferably corresponds to the rate of air flow when main filter has reached the end of its life. The signal could include an audio or visual signal. Preferably, the same or a different process failure light 102 is illuminated.

Air flow sensor 42 may also be used to monitor filter life. For example, one of the preset value programmed into controller 6 preferably corresponds to the rate of air flow when main filter 10 is approaching the end of its life and/or when main filter 10 has reached the end of its life. If controller 6 receives a signal from air flow sensor 42 that main filter 10 is approaching the end of its life, this signal may be used to signal a user that filter assembly 29, or at least main filter 10, is approaching the end of its life and, thus, may be used to cause filter monitor light 55 to flash. If controller 6 receives a signal from air flow sensor 42 that main filter 10 has reached the end of its life, this signal may be used to signal a user that filter assembly 29, or at least main filter 10, has reached the end of its life and, thus, may be used to cause filter monitor light 55 to stay on full time.

The amount of ozone produced by ozone generator 20 may be monitored by monitoring the concentration of ozone in the air exiting ozone generator 20 and preferably, by monitoring the current drawn by ozone generator 20.

A current sensor may be electrically connected to ozone generator 20 to monitor whether sufficient power is being drawn by ozone generator 20 to produce a predetermined amount of ozone. The current sensor 114 may be any type as is well known in the art. For example, an acceptable current range for the primary coil 21 may be preset prior to the initiation of a water treatment cycle. This current range is based on the ozone generator 20 drawing a current that is indicative of the ozone generator 20 producing a predetermined amount of ozone per unit time. If the current sensor 114 senses that the current to the primary coil 21 is either too high or too low, a signal is preferably sent to the micro-controller 6 to terminate the water treatment cycle and actuate a signal to notify the user of a system failure. The signal could include an audio or a visual signal. Preferably, the same or a different process failure light 102 is illuminated.

In accordance with the instant invention, a simplified method of monitoring the current drawn by ozone generator 20 is provided. According to this construction, current sensor 114 comprises a light emitting member 46 powered by the same current source as the ozone generator 20 and a light sensor 98 located proximate to light emitting member 46 to monitor the amount of illumination produced by light emitting member 46. The level of illumination provided by light emitting member 46 can be correlated to the level of current being drawn by the ozone generator 20 and, as such, the signal received by light sensor 98 is an indirect measure of the level of current drawn by the ozone generator 20. This information can be related to the concentration of ozone being produced by the ozone generator 20. Preferably, the light emitting member 46 is a light bulb, and more preferably a neon light bulb. Specifically, the neon light bulb 46 is preferably capacitively coupled to the high voltage secondary bobbin 23. An acceptable range for the light sensor 98 is preferably preset prior to the initiation of a water treatment cycle. If the illumination of the neon bulb 46 as sensed by the light sensor 98 is too high or too low, a signal may be sent to the micro-controller 6 to terminate the water treatment cycle and actuate a signal to notify the user of a system failure. The signal could include an audio or a visual signal. Preferably, the same or a different process failure light 102 is illuminated. For example, the dielectric 62 may crack, or otherwise break down. Additionally, it is possible for the ozone generator 20 to become disconnected from the high voltage source. Moreover, it is possible for the high voltage transformer to fail altogether. If any of these events occur, current sensor 114 will detect a change in current supplied to the ozone generator 20, the brightness of the neon light bulb 46 connected to the ozone generator 20 will vary accordingly. It will be appreciated that other electromagnetic wavelengths, other than visible light, may be utilized.

These parameters can be monitored either on an intermittent basis, or more preferably, on a continual basis. Moreover, these parameters can be monitored for only a part of the water treatment cycle, or more preferably, for the entire duration of the water treatment cycle.

The gas flow sensor may be beneficially employed to terminate the water treatment cycle when the filter assembly 29 is removed from the system 100. When the filter assembly 29 is removed from the system, the flow of water through both the filtration loop 120 and the ozonation loop 122 will be interrupted. In normal operation, the flow of water through venturi 33 causes air to be drawn in past the air flow sensor 42. Accordingly, if the filter assembly 29 is removed from the system 100, water will no longer flow through the ozonation loop, and air will no longer be drawn into the ozone generator 20. Thus, the gas flow sensor 42 will register this change in gas flow rate, and send a signal to the micro-controller 6 to actuate a signal to terminate the water treatment cycle, and notify the user of a system failure. Thus one of the preset values programmed into micro-controller 6 may optionally be a value corresponding to the flow rate of air through ozone generator 20 when filter assembly 29 is removed from apparatus 29. It will be appreciated that micro-controller is preferably programmed to terminate a treatment cycle when the flow rate through ozone generator 20 decreases by a lesser amount which is indicative of a small leak in the air/ozone fluid flow passage. The signal could be audio or visual and is preferably the same or a different process failure light 102.

The filter life may be monitored other than by counting cycles such as by the time required for the volume of water in reactor 9 to pass through a filter element. For example, a timer may optionally be employed to monitor the time required for the water to pass through the polishing filter 54. By monitoring this parameter, it is possible to indirectly monitor the amount of blockage of the polishing filter 54 and this could be correlated to the amount of filter life remaining for main filter 10 and or pre-filter 8. The timer employed may be any that is well know in the art. A dispense cycle is initiated by depressing the dispense switch 53. When the filter assembly 29 is in good working order, the duration of the dispense cycle, represented by the time to pass the entire batch of water through the polishing filter 54, is known. Two different flow times, which are both longer than the normal duration of the dispense cycle, may be preset in controller 6. When the duration of the dispense cycle corresponds to the first preset time, micro-controller 6 sends a signal to warn the user that the filter assembly 29 must be changed soon. Preferably, the signal is filter monitor light switch 55, which flashes when the first preset time is reached. Subsequent dispense cycles are monitored, and when the duration of the dispense cycle corresponds to a second preset time, micro-controller 6 sends a signal to warn the user that the filter assembly 29 must be replaced in order to initiate a new water treatment cycle. Preferably, this second signal is filter monitor light switch 55, which is fully lit when the second preset time is reached. At this point, the system 100 will not initiate a new cycle until the filter assembly 29 is replaced.

The filter life may also be monitored by a water flow sensor to monitor the flow rate of water passing through the polishing filter 54 and/or, a pressure sensor may optionally be employed to monitor the pressure of the water passing through the polishing filter 54 (designated by reference numeral 118 in FIG. 2). By monitoring either or both parameter, it is possible to monitor the amount of blockage of the polishing filter 54 and this can be correlated to the amount of filter life of main filter 10 and/or pre0-filter 8. The sensor employed may be any type as is well known in the art. A dispense cycle is initiated by depressing the dispense switch 53. When the filter assembly 29 is in good working order, the flow rate and back pressure caused by the water passing through the polishing filter 54 is known. Two different water flow rates/back pressures, which are both less than the normal water flow rates (or higher than the normal back pressure), may be preset into controller 6. When the flow rate of the water through the polishing filter 54 corresponds to the first preset flow rate (or the pressure corresponds to the first back pressure), micro-controller 6 sends a signal to warn the user that the filter assembly 29 must be changed soon. Preferably, the signal is a filter monitor light switch 55, which flashes when the first preset flow rate is reached. Subsequent dispense cycles are monitored, and when the flow rate of the water through the polishing filter 54 corresponds to a second preset flow rate (or the pressure corresponds to the second back pressure), micro-controller 6 sends a signal to warn the user that the filter assembly 29 must be replaced in order to initiate a new water treatment cycle. Preferably, the signal is the filter monitor light switch 55, which is fully lit when the second preset flow rate is reached. At this point, the system 100 will not initiate a new cycle until the filter assembly 29 is replaced. It will be appreciated that the apparatus need not have a polishing filter and that any of these methods may be used to monitor the filter life of the filter through which the water passes as it is dispensed (the exit filter).

I claim:

1. A method of monitoring the production of ozone from an ozone generator comprising:
    (a) providing an electric circuit comprising an electric current source for powering the ozone generator and the ozone generator;
    (b) providing a light emitting member to emit a signal representative of the level of current drawn by the ozone generator; and,
    (c) using a sensor to monitor the signal produced by the member.

2. The method as claimed in claim 1 wherein the member broadcasts a signal.

3. The method as claimed in claim 1 wherein the light emitting member is powered by the electric current source to provide a level of illumination indicative of the level of current drawn by the ozone generator.

4. The method as claimed in claim 1 further comprising passing air through a gas flow path in a water treatment apparatus which includes an ozone generator, monitoring the rate of flow of air through the gas flow passage and monitoring the amount of ozone produced by the ozone generator by monitoring the signal provided by the light emitting member and terminating the operation of the water treatment apparatus if one or both the rate of flow of air and the amount of ozone produced by the ozone generator vary from preset values.

5. The method as claimed in claim 1 wherein the light emitting member is powered by the electric current source to provide a level of illumination indicative of the level of current drawn by the ozone generator and the sensor monitors the amount of illumination produced by the light emitting member.

6. The method as claimed in claim 1 wherein the light emitting member is capacitively coupled to the electrical circuit.

7. The method as claimed in claim 1 wherein the sensor is a light sensor.

8. The method as claimed in claim 7 wherein the light emitting member is capacitively coupled to the ozone generator.

9. The method as claimed in claim 8 wherein the light emitting member comprises a neon light bulb.

10. The method as claimed in claim 1 wherein the member to emit a signal representative of the level of current drawn by the ozone generator is a electrically powered light emitting member which is powered by the electric current source to provide a level of illumination indicative of the level of current drawn by the ozone generator and the sensor monitors the amount of illumination produced by the light emitting member.

11. A method of monitoring the production of ozone from an ozone generator comprising:
    (a) providing an electric circuit comprising an electric current source for powering the ozone generator and the ozone generator;
    (b) providing a member which is capacitively coupled to the electrical circuit and which emits a signal representative of the level of current drawn by the ozone generator; and, (c) using a sensor to monitor the signal produced by the member.

12. The method as claimed in claim 11 wherein the member broadcasts a signal.

13. The method as claimed in claim 11 wherein the member emits an electromagnetic signal.

14. The method as claimed in claim 11 wherein the member is an electrically powered light emitting member which is powered by the electric current source to provide a level of illumination indicative of the level of current drawn by the ozone generator.

15. The method as claimed in claim 11 further comprising passing air through a gas flow path in a water treatment apparatus which includes an ozone generator, monitoring the rate of flow of air through the gas flow passage and monitoring the amount of ozone produced by the ozone generator by monitoring the signal provided by the member and terminating the operation of the water treatment apparatus if one or both the rate of flow of air and the amount of ozone produced by the ozone generator vary from preset values.

16. The method as claimed in claim 11 wherein the member is a light emitting member and the sensor is a light sensor.

17. The method as claimed in claim 16 wherein the light emitting member comprises a neon light bulb.

* * * * *